No. 790,466. PATENTED MAY 23, 1905.
T. L. VALERIUS.
CREAM RIPENER.
APPLICATION FILED AUG. 29, 1904.
3 SHEETS—SHEET 3.
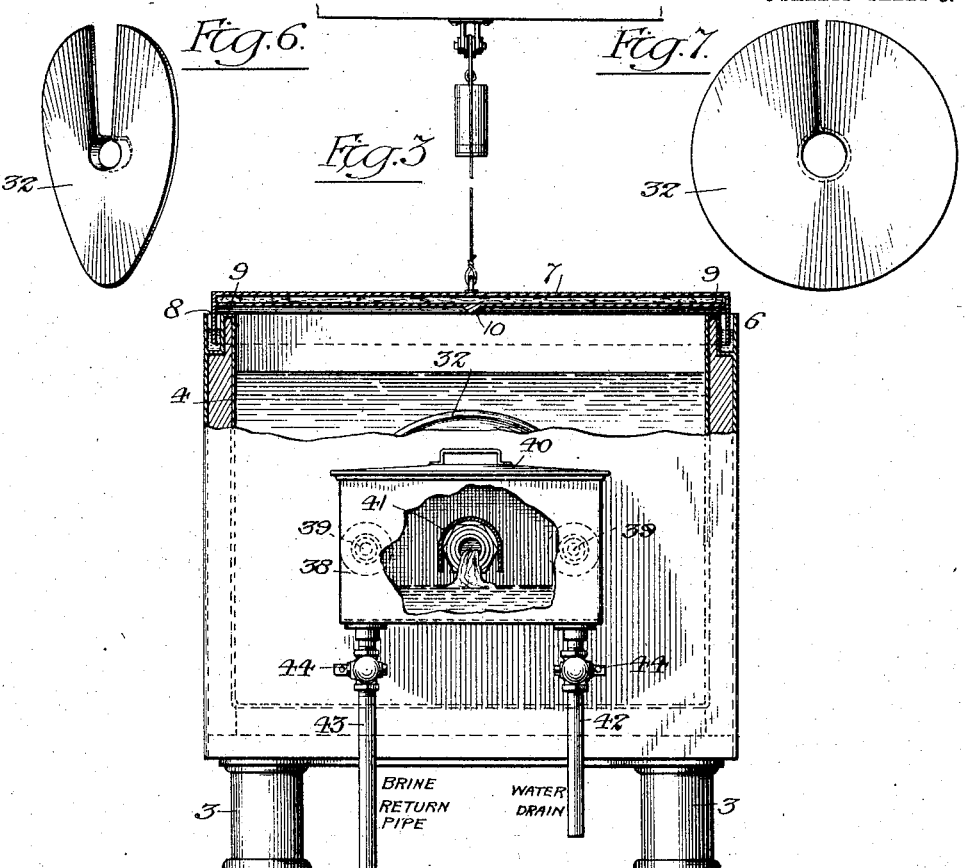
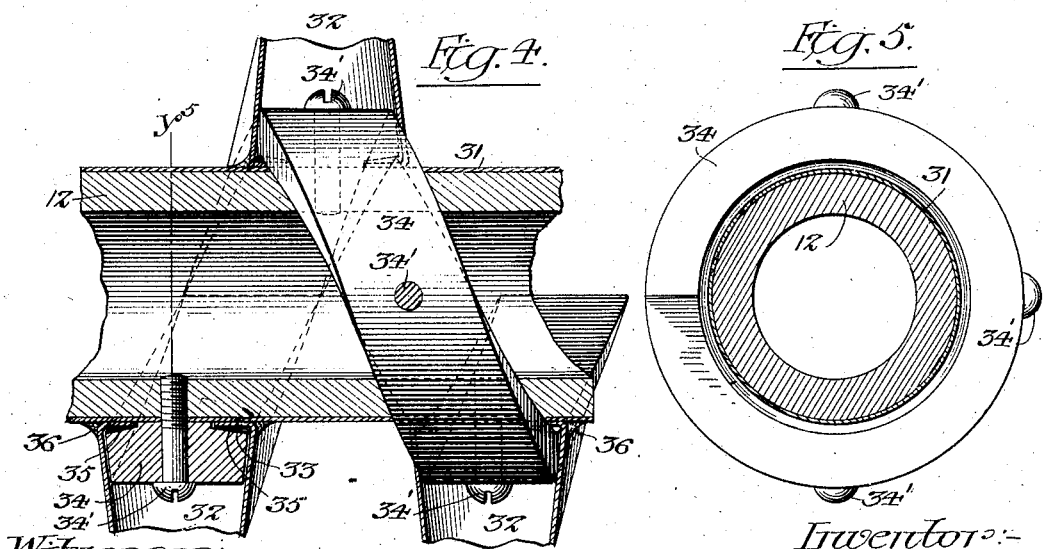
Witnesses:—
Louis M. T. Whitehead
John R. Lefevre
Inventor:—
Theodore L. Valerius
by C. V. Hawley
Atty No. 790,466. Patented May 23, 1905.

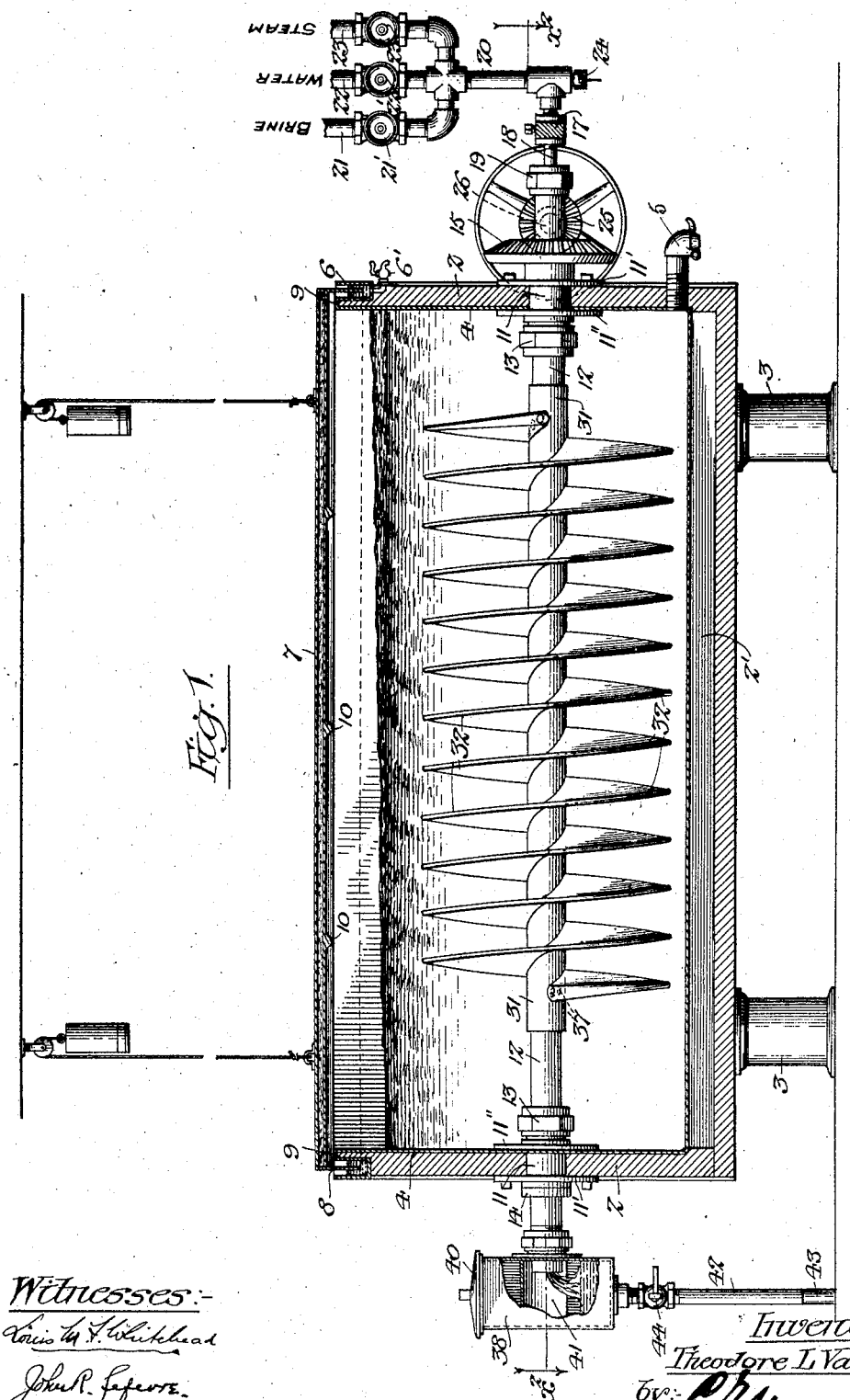

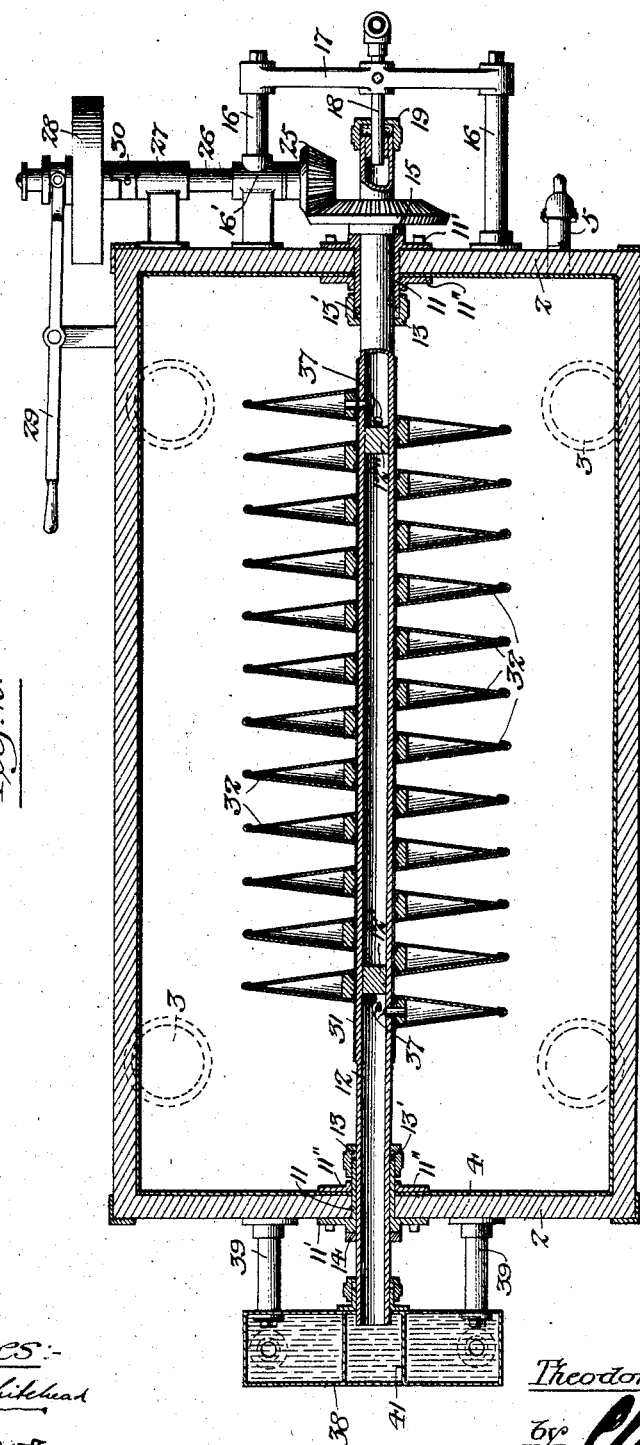

UNITED STATES PATENT OFFICE.

THEODORE L. VALERIUS, OF FORT ATKINSON, WISCONSIN, ASSIGNOR TO THE CREAMERY PACKAGE M'F'G. COMPANY, OF CHICAGO, ILLINOIS, A CORPORATION OF ILLINOIS.

CREAM-RIPENER.

SPECIFICATION forming part of Letters Patent No. 790,466, dated May 23, 1905.

Application filed August 29, 1904. Serial No. 222,578.

*To all whom it may concern:*

Be it known that I, THEODORE L. VALERIUS, of Fort Atkinson, Jefferson county, Wisconsin, have invented a certain new, useful, and Improved Cream-Ripener, of which the following is a specification.

My invention relates to apparatus for employment in the art of butter-making, and has particular reference to cream-ripeners for creameries where large quantities of butter are produced.

To obtain the best yield of butter from cream, it is necessary to ripen, sour, or ferment the cream before it is churned. The present process of ripening cream—a process which is very old—is extremely simple. It consists in steps substantially as follows: The cream from which butter is to be made is placed in a suitable vat or so-called "ripener" some hours before the time for churning. The cream will of its own accord ferment and reach the desired state of acidity if left in the vat for sufficient time; but to accelerate the fermentation a quantity of starter of lactic-acid ferment is admixed with the cream before or immediately after it is placed in the vat or ripener. Inasmuch as the rate at which fermentation will progress in cream containing a proper proportion of starter is regulated by the temperature of the cream, the next step of the process consists in tempering the cream. It has been found that sweet cream that is set during the early part of one day will ripen with sufficient rapidly to be ready for churning the next day, provided the temperature of the cream is maintained at about 58° to 60°. While cream may be ripened in less time, it has been the custom to devote the afternoon and night to the process, churning being done but once a day. When the supply of cream is less than normal, it is customary to protract the ripening process by conducting same at a lower temperature and to churn only once in two days. If the cream is received cool, its temperature is raised by surrounding the mass with warm water or by placing therein receptacles containing a fluid of suitable temperature. On the other hand, as in the summer, when the cream is received at a relatively high temperature, it is necessary to reduce the temperature by application of cold water or ice. As the temperature of the cream may change materially during the time that it is in the vat, it is customary to heat or cool it to so control the fermentation that the cream will be neither overripe nor underripe at the churning time. As is well known, if cream is allowed to ferment beyond a certain point putrefaction sets in, with deleterious effect, and it is therefore necessary that a butter-maker shall frequently test the ripening cream and stop the fermentation when the cream has become of the desired acidity or else immediately churn the cream. Fermentation may be practically stopped by reducing the temperature of the cream to approximately 45°, and to this end and to avoid the use of ice in the cream it is common to employ cream ripeners or vats which are provided with water spaces or walls or which contain coils or passages through which cool water or brine may be passed. In like manner and with warmer fluids these vats or ripeners are used for heating the cream when necessary. The performance of ripeners of these general classes is quite satisfactory when closely watched and when the quantity of cream is small; but with the increase in the capacity of vats or ripeners and with the introduction of gathered cream many difficulties are encountered. The tendency of the present time is to increase the size and capacity of all creamery apparatus and machinery with a view to greater productiveness, and from a desire to reduce carrying costs and charges the farmers in many sections separate the cream from the milk at their own dairies and take or ship only the cream to the creameries. This naturally results in the delivery of various grades of cream to the butter-maker—that is, some lots are thin, containing small proportions of butter-fat, while others are thick and almost pasty. Cream which is supplied in this way is known as "gathered" cream, and much of it is carried long distances. Furthermore, out of the practice of using gathered cream has grown the abuse of holding cream from day to day until the quantity accumulated is sufficient to warrant delivery, with the result that much of the cream received at a creamery in a single day is far advanced in fermentation and is likely to be clotted or leathery, and yet must be mixed with the fresher cream of the day in order to save it from actual putrefaction and loss. Even when all the lots are sweet and fresh it is difficult to thoroughly mix them and produce a good admixture of starter without churning the cream to a detrimental degree. The difficulties attending the use of varying lots of fresh cream are aggravated in the case of gathered cream. Such difficulties are again increased in attempting to handle large masses of gathered cream in a single vat, as will be explained hereinafter.

To produce butter of the best quality, it is necessary that the cream placed in the churn shall be of uniform consistency and acidity throughout. If the cream is unevenly ripe or acid, the butter produced therefrom will be of poor quality, and in addition to the loss in value considerable proportions of butter-fat will be left in the buttermilk when improperly-ripened cream is churned.

I apprehend that one reason why large cream-ripeners fail to produce good results is that portions of the large body of cream are so far removed from the tempering walls or coils of the ripener that they are less affected by the temperature thereof than those portions which are in immediate contact with or adjacent to the walls or coils. Obviously in such cases the rates of fermentation will be different in the various parts of the vat, and there being no means of equalization the product finally taken therefrom will be of poor quality. Again, even a mass of fresh cream admixed with starter has a tendency to stratify, the starter and the serum settling toward the bottom of the vat, while the fats tend to rise. In consequence the lower portions of a fermenting body of cream frequently become fully acid and even putrefy before the cream in the top of the vat is sufficiently ripe to be churned. As bearing upon this phenomenon I find that the rotary coils which are sometimes used only aggravate the separating tendency of the starter and the acidulated portions, and, further, that the greater the depth of cream in the vat the more likely it is to ripen unevenly. It will be evident that because of its lack of uniformity in all particulars a body of gathered cream as a matter of course yields even less readily than does fresh cream to admixture with starter, is more likely to be churned if agitated, is more difficult to blend, is slower and less likely than fresh cream to respond to the influence of the heating and cooling devices, and is apt to spoil through putrefaction in some portions unless the fermentation of the body as a whole is checked and stopped as soon as any portion has developed full acidity, and lack of acidity in the major portion of such a body is sure to cut down the butter yield and occasion serious loss.

The conditions and difficulties surrounding the ripening of cream in large quantities and as particularly bearing upon the production of butter from gathered cream being now understood, the object of my invention may be defined as being to provide a cream-ripener which may be advantageously used in any size and whereby any and all kinds of cream may be ripened uniformly and thoroughly without danger of overripening or churning any portion of the cream.

I have invented a novel improved process of ripening cream, which though reserved for a separate application for patent will be generally characterized or described hereinafter; and the particular object of my invention is to provide a cream-ripener which shall be capable of carrying out said novel process. A chief feature or step of said process, and one which would seem to be almost obvious in view of admitted facts, resides in vigorously stirring or agitating the whole body of cream in a vat to give all parts the same consistency and temperature, and thereby positively and regulably enforce the uniform fermentation of the whole body of cream. As contrasted with my invention it has been generally supposed that any agitation of ripening cream would retard fermentation and result in a poorer instead of a better product, and, furthermore, that such agitation would result in a serious loss by prematurely churning the cream. Common experience and many special experiments prove that known ripeners cannot be utilized in any process which like mine requires the agitation and mixing of the cream, and every attempt to so use the same has resulted disastrously. For this reason I have been compelled to seek other and new means for carrying my invention into practical commercial effect.

My process may without difficulty be performed by hand if the quantity of cream under treatment is small, but involves too much labor when the body of cream is large. I have therefore devised and my invention consists in the hereinafter-described cream-ripener, which is capable of handling the largest quantity of cream and, furthermore, cream of all kinds and conditions, the ripener operating to reduce the cream to a condition of uniform consistency, to thoroughly emulsify the mass and disseminate the starter therein, to aerate—i. e., expose all parts of the mass to the atmosphere—to impart any desired temperature to the mass as a whole, to maintain the condition or state of uniformity throughout the period of fermentation and at all temperatures, and also operating to refrigerate the ripened cream, all without impeding the ripening process and without churning the cream.

My invention may be more specifically defined as a cream-ripener which comprises a vat or receptacle in combination with a stirring device arranged in said vat and adapted to drive or circulate the cream from end to end of the vat and to set up vigorous agitation and conflicting currents; and, further, my invention consists in a ripener which has a stirring or circulating device that operates to mechanically smooth or break up the clots and leathery portions contained in the body of cream; and, further, my invention includes means for increasing, decreasing, or holding the temperature of the body of cream while in the described state of agitation and during the fermentation period; and particularly my invention consists in a cream-ripener comprising a vat in combination with a long rotary spiral arranged in said vat and through which a tempering fluid is passed to effect the heating or cooling of the body of cream in the vat, said spiral being of much less diameter than the width of said vat to leave large return-flow spaces around the spiral, and said spiral being rotated with sufficient speed to forcibly agitate the contents of the vat and cause the rapid longitudinal flow thereof in the vat; and, further, my invention consists in various details of construction and in combinations of parts, all as hereinafter described, and particularly pointed out in the claims.

My invention will be more readily understood by reference to the accompanying drawings, forming a part of this specification, and in which—

Figure 1 is a vertical longitudinal section of a cream-ripener embodying my invention. Fig. 2 is a section plan view thereof on the line $x^2 x^2$ of Fig. 1. Fig. 3 is an end view of the cream-ripener, the upper portion thereof being broken away to show the construction of the cover. Fig. 4 is an enlarged sectional detail showing the axial portion of the cream emulsifying and tempering device which operates within the vat. Fig. 5 is a transverse section substantially on the line $y^5$ of Fig. 4, being an end view of one of the spiral sections upon the hollow shaft; and Figs. 6 and 7 are perspective details of one of the many sheet-metal disks which together make up the long hollow spiral portion of the mixing or emulsifying device.

My cream-ripener may be made and is successful in all sizes; but the drawings are intended to illustrate a riper of several tons capacity, this particular vat being about ten feet long, five and a half feet wide, and four and a half feet deep, with a rotary member that is approximately three feet in diameter. Said rotary member has a hollow shaft held in the ends of the vat and preferably always partakes of the form of a spiral that is continuous from end to end. Respecting the cost and efficiency of the ripener, I have secured the best results with such a spiral device; but the rotary member may be made in other forms without departing from my invention. The said spiral is hollow and is supplied with tempering fluid through the hollow shaft. When rotated, the spiral causes the contents of the vat to circulate from end to end of the vat and also causes the same to boil vigorously, many conflicting currents being set up by the rotation of the spiral within the confining-walls. The spiral has no tendency to agitate the cream to the extent of lifting or dashing the same about and for this reason may be operated at high speed without endangering the cream. I am careful to make the rotary member of much less width and depth than the vat, and in this way provide ample spaces at the sides of and beneath said member, through which the cream that is propelled toward one end of the vat may return to the opposite end, eddying and boiling as it goes, but free from any compression or restraint that would tend to churn it. It is obvious that the temperature of the mass of cream thus set in motion may be quickly influenced and equalized through the medium of the rotary member, and I prefer to make the same hollow to serve as a channel for the tempering fluid, as described. Nevertheless I do not by this statement intend to confine my invention to a hollow spiral, as it is possible to simultaneously agitate, smoothen, and temper the mass of cream by separate instead of identical means. A brief statement of the functions performed and the results accomplished by the machine thus described will facilitate the description and understanding of its details.

The cream from the separators or on its arrival at the creamery is poured or dumped into the ripener. The spiral is started and kept in rotation from the time when there is enough cream in the bottom of the vat to partly immerse the spiral. In other words, I have found it desirable to prevent the localizing of temperatures or of fermentation and to start the blending and equalization of the different lots of cream from the very beginning of the reception of the cream. During this period it is not only advantageous to equalize the temperature and begin the aeration of the cream, but to also reduce the temperature of the cream to a point where its further fermentation will be practically stopped until the whole supply of cream has been received. This reduction of temperature is brought about by passing cold water or brine through the spiral. These operations are continued until the vat has been filled with cream, and as this occupies a considerable period the whole mass or body, unless composed of very bad cream, is by that time in condition to receive the starter or lactic-acid ferment—that is, the rapid rotation of the cold spiral in the cream and the circulation and boiling action of the cream in the vat will have not only reduced the temperature of the mass, but will have equalized the same in all parts of the vat, and, further, will have reduced the component lots of cream to a homogeneous mass of substantially uniform consistency, smoothing out and breaking up the denser portions to prepare the cream for admixture with the starting fluid. A further important result of the early circulation and agitation which continues during the filling operation is the effective aeration of the cream, every part thereof being at some time exposed to the atmosphere, which rids the cream of noxious and deleterious oils, vapors, and gases.

A quantity of starting fluid may be placed in the vat before it is filled; but I prefer to withhold the starter until the cream has been made uniform as to temperature, consistency, or texture. The required quantity of fluid is then poured into the vat and is quickly admixed with the cream by the action of the rotating spiral. The effect of the spiral's action is such that the actual emulsification of the cream and starter is thus accomplished, the fats being held in a uniform state of suspension, and thus properly exposed to the liberating action of the lactic ferment. When it is thought that the starter has been uniformly distributed in the mass of cream, a warm fluid, such as hot water or water and steam, is admitted to the hollow spiral, and said spiral continuing to rotate and circulate the contents of the vat the said contents are quickly raised to a temperature that is conducive to the rapid development of the starter bacteria, hence the fermentation of the mass as a whole. This higher temperature, usually approximating 70° to 80° Fahrenheit, is maintained, and the smoothing and emulsifying process is continued until the cream attains a sufficient degree of acidity or ripeness, at which time it will be found to be a smooth and uniform though comparatively thick liquid, free from liberated butter particles and, save for its temperature, ready for the churn. Fermentation may be hastened or retarded, as desired, by regulating the temperature of the rotary spiral, and, if desired, the spiral may be stopped for part of the time after the cream has been thoroughly emulsified and tempered. Before the cream is taken from the vat its temperature is reduced to and held for a time at about 50° Fahrenheit to prevent putrefactive fermentation and to equalize and hold the low temperature of the butter-fat and serum with a view to avoiding a subsequent rise of temperature in the churn. To thus cool the contents of the vat, it is only necessary to continue the rotation of the spiral and turn cold water or brine into the same.

It should be understood that the vat is preferably closed or covered at all times except during the time the vat is being filled, but that the contents of the vat is practically exposed to the atmosphere at all times through the employment of a peculiar cover, hereinafter described, which permits the escape of vapors and gases from and the entrance of air into the vat while excluding insects and atmospheric odors.

Proceeding now to the description of my machine in detail, 2 represents a tank or vat, preferably resting upon foundation-pedestals 3. When made of wood, the vat is provided with a metal lining 4, beneath which is an air-space 2', which serves as an insulator.

5 is the drain connection of the vat, same being normally closed.

The upper edge of the vat is provided with a shallow trough 6, preferably formed solidly with the metal lining 4.

7 is a cover, preferably composed of several thicknesses of metal, with interposed insulation, and this cover is provided with a deep flange 8, that is adapted to occupy the trough or groove 6 in the top of the vat. The cover rests upon the inner edge 9 of the vat-top, but does not make a tight joint therewith, there being several ribs 10 on the under side of the cover. The groove 6 is filled with water, which with the flange 8 and the walls of the groove 6 completes a perfect water or liquid seal for the top of the vat. The stand of water is insufficient to prevent the escape of pressure or gases from within the vat or the entrance of air to relieve any tendency toward a vacuum within the vat. In either case the gas or air will bubble through the water seal without expelling the water from the groove 6. It is obvious that this seal effectually prevents the entrance of deleterious odors from the surrounding atmosphere and also serves to exclude insects from the vat. 6' represents a drain-cock connected with the groove 6 for emptying the same. For convenience the weight of the cover is preferably counterbalanced, as shown in Fig. 1, so that it may be easily raised. The water contained in the groove is more or less polluted when cream is ripened in the vat. Hence it is desirable that the groove be cleaned and the water changed frequently. It will be observed that the groove is wide open at the top, making it easy to clean when the cover is raised. I deem it essential to close the top of the ripener in this way, and regard the construction described as an important element of my invention.

Each end of the vat is provided with a bearing 11 for the hollow shaft 12 of the circulating, agitating, tempering, or emulsifying device, hereinbefore referred to as the "rotary" element. As shown in Fig. 2, each bearing comprises the sleeve or bearing proper, 11, having on its outer end a flange 11', that is bolted to the end of the vat. On the inner end of the bearing is a wide flange 11'', which makes a tight joint with the metal lining 4. The inner end of the bearing 11 is threaded to receive the stuffing-box 13, containing packing 13' for making a tight joint between the bearing 11 and the shaft 12. A collar 14 on one end of the shaft and the hub of the bevel-gear 15 on the other end of the shaft together prevent longitudinal movement of the shaft in its bearings. By placing the stuffing-boxes on the inner ends of the bearing oil which is placed on the outer ends of the bearing is excluded from the interior of the vat, and, furthermore, cream which seeks to escape through the stuffing-box tends to lubricate the bearings and expel the oil that might otherwise enter therefrom.

The bevel-gear end of the vat is provided with a light frame to sustain the fluid connections. This frame comprises studs 16 16 and cross-bar 17, containing a holder for the fluid connection 18. Said connection comprises a tube which enters the end of the hollow shaft 12, as shown in Fig. 2. The joint between the tube 18 and the shaft is closed by reducing the opening in the end of the shaft and applying the stuffing-box 19.

20 is the mixing-tube, to the lower end of which the tube 18 is connected. At the upper end of the part 20 I attach the brine, water, and steam connections 21, 22, and 23, provided with valves 21', 22', and 23', respectively. By manipulating these valves any desired admixture of water and steam or of steam and brine may be secured. If desired, the valves may be used separately. The lower end of the mixing-tube 20 is provided with a valve 24 for draining the same after the ripener has been used, and more particularly for admitting air to destroy any tendency toward a vacuum within the rotary agitating device, as when it is cool and steam has been admitted to it.

The shaft 12 may be rotated in any suitable manner; but I prefer to employ the pair of bevel-gears 15 and 25, the latter being arranged on a transverse shaft 26 in bearings 16' and 27.

28 is the drive-belt pulley, slidable on the shaft 26 and movable by means of a convenient lever 29. The connection between the pulley and the shaft 26 is effected by means of a chuck, one part of which is on the pulley and the other, 30, of which is fixed on the shaft 26.

The rotary device within the vat may be stopped and started by means of the lever 29.

The hollow spiral is continuous from end to end and receives fluid at one end of the shaft and discharges it through the other. Because of the tempering-fluid connection that end of the vat is termed the "head" end, and it is toward this end that the cream is propelled by the rotating spiral. I prefer to set the spiral on the shaft nearer the head end of the vat than the rear end thereof, the larger space being provided in said rear end. The purpose of so setting the spiral is to effect the crowding or forcing of the cream most vigorously at the head end of the vat and to relieve it from all pressure as it flows toward the rear end of the vat, to the end that the cream may flow naturally to the receiving end of the spiral. The construction of the spiral 32 is well shown in Figs. 2, 4, 5, 6, and 7. The shaft 12, which is generally a steel pipe having its ends turned to fit the bearings 11, is sheathed with copper 31. This sheath is soldered to the shaft and is used to facilitate the soldering of the central joints between the parts of the spiral or screw and the shaft. The hollow spiral 32 is formed by a plurality of sheet metal, preferably copper or tinned, disks, each of which is cut upon a radial line, and the ends thus formed, drawn apart, form the disk into a spiral. The ends of adjacent disks are joined in series to present an unbroken surface from end to end of the spiral. It will be understood that there are two sets of disks, one set forming the front surface of the spiral 32 and the other the back surface thereof, and on referring to the drawings it will be seen that the peripheral edges of the front and back disks are drawn together. I prefer to subject the disks to the action of spiral dies to give the same a permanent set before undertaking to place them upon the shaft 12. If desired, said dies may be formed to also effect the necessary lateral pitch of the disks, and thereby facilitate the joining of the edges of the front and back disks. In such case it is necessary to employ two dies, the front and back disks being relatively reversed. The cross-section of the spiral is triangular, and I prefer that the base of each triangular section shall be greater than the distance between the bases of adjacent triangles. Each spiral-forming disk is provided with a central hole to receive the shaft 12 and is also provided with an inwardly-turned flange 33, adapted to fit snugly around the copper sheath of the shaft. The flange-opening in the disk conforms to the pitch of the spiral upon the shaft, which corresponds to the peripheral pitch of the spiral or screw. For spacing the front and back disks apart I employ a spiral thread on the shaft and preferably make this thread in sections, as illustrated in Figs. 4 and 5. These sections 34 may be of cast metal and are secured to the shaft by screws 34'. The inner surface of the spiral-section 34 is reduced in width, as shown in Fig. 4, to provide space 35 for the reception of the disk-flanges 33. In this manner the front and back disks are properly spaced and are also forced and held to the proper spiral planes, and, furthermore, are securely attached to the shaft. The joints between the sheath 31 and the flanged edges of the disk are closed by solder, as shown at points 36, it being an easy matter to sweat solder into the flange-joints and to wipe solder into the spiral corners between the disk and the shaft.

Particular stress is laid upon this feature of my invention, as I am thereby enabled to avoid the presence of uncleanly projections or cracks at the axis of the rotary member. Said member is therefore easy to clean. In building up the hollow spiral I prefer to place one of the sections 34 on the shaft and then screw the disks into place thereon. When this has been done, the next spiral section of the thread 34 is put in place and the next disks are secured thereon. When the disks are thus placed, their edges are drawn together, lapped or double seamed, and soldered, and the radial joints between successive disks are then closed. The drawing together of the disks operates to put them under tension, and therefore tends to nullify the effect of slack in the metal from which the disks are made. The extreme ends of the spiral are closed by drawing component disk ends together or by separate pieces set between said ends, as desired. I prefer that the ends of the spiral shall be substantially sharp to avoid any dashing effect upon the cream when the spiral is rotated.

The shaft 12 contains two blocks, plugs, or projections 12' 12" adjacent to the ends of the spiral, and at each end said shaft is provided with holes 37, which lead into the front and rear ends of the spiral, respectively.

The tempering fluid which is supplied to the hollow shaft flows through the holes 37 into the forward end of the hollow spiral. From this it flows through or traverses the spiral, passing spirally around the shaft until the water reaches the discharge-opening 37 at the rear end of the spiral, whence it passes into the hollow discharge end of shaft 12. After performing its function the tempering fluid is discharged into a basin or box 38, supported by studs 39 on the rear end of the vat. This box is provided with a cover 40 and contains a hood 41, the purpose of the latter being to prevent the splashing of the liquid which is delivered into the box.

42 and 43 represent drain connections, each having a valve 44. One of these connections may be short to deliver the water upon the floor of the room. The other is intended to be connected to the brine-pump. It is the usual practice to permit the water to waste, while the brine, because of its greater cost, is usually circulated.

The detailed operation of my invention is as follows: The vat being empty and clean, ready to receive cream, is gradually filled with cream as it arrives at the creamery. As soon as the body of cream rises into contact with the bottom of the rotary spiral said spiral is started into action by throwing the clutch-lever 29. At the same time the cold-water valve 22' or the brine-valve 21 is opened to admit a cold fluid to the tube 20, connection 18, and shaft 12. The hollow spiral will be quickly filled with a cold fluid, the latter being thereafter continuously discharged into the basin 38. If brine is being used, the valve in pipe 42 is closed and the other valve opened to permit the return of the brine to the cooling and circulating apparatus. The rotation of the spiral in the cream favorably affects same, as hereinbefore described. When the full supply of cream has been placed in the vat, the cold fluid is partially or wholly turned off and steam is admitted to the spiral through valve 23' to raise the temperature of the agitating or emulsifying device. The temperature may be easily controlled at all times by manipulating the several fluid-valves 21', 22', and 23'. Upon completion of the fermenting process as hereinbefore described the warmer fluid is excluded from the tempering device and a cold fluid is admitted thereto to chill the body of ripened cream and preserve and prepare the same for churning. The ripened cream is finally drawn off or pumped from the vat, after which the vat is cleaned and made ready for the next lot or batch of cream.

It is obvious that fairly good results, though with more danger of churning, may be secured with a vat in which the rotary member occupies a vertical position, and my invention includes such a construction. It is further obvious that numerous modifications of my invention will readily suggest themselves to one skilled in the art, and I therefore do not confine my invention to the specific constructions herein shown and described.

Having thus described my invention, I claim as new and desire to secure by Letters Patent—

1. In a cream-ripener, a suitable cream-vat, in combination with a mechanical device therein, normally immersed in contained cream and adapted to cause the rapid circulation and boiling action of the whole body of cream without churning the same, and means for heating and cooling the cream while in circulation, substantially as described.

2. In a cream-ripener, a vat, in combination with rotatable means adapted to cause the rapid longitudinal circulation of the contents of the vat and set up conflicting lateral currents within said contents, and said means being also adapted to smooth said contents; whereby to emulsify said contents, substantially as described.

3. In a cream-ripener, a vat, in combination with a rotary internally-tempered member, of much less width and length, operable in said vat and adapted to circulate, emulsify and temper the contents of said vat, substantially as described.

4. In a cream-ripener, a vat, in combination with a horizontally-arranged rotary cream propelling and tempering device in said vat, said device being of small dimensions, compared with the containing-vat, means for rotating said device and means for heating and cooling said device; whereby to reduce the contents of the vat to an emulsion of uniform consistency and temperature, substantially as described.

5. In a cream-ripener, a vat, in combination with a rotary spiral, arranged upon a horizontal axis in said vat and adapted to cause the circulation of the contained mass or body from end to end of the vat and outward from said axis, there being wide spaces or channels between the spiral and the walls of the vat, substantially as described.

6. In a cream-ripener, a vat, in combination with a rotary spiral mounted upon a horizontal axis within said vat, said spiral being of much less diameter than the width of said vat, there being large return-flow spaces between the spiral and the sides of the vat, and means for raising or lowering the temperature of said spiral to regulate the temperature of the cream contained in said vat, substantially as and for the purpose specified.

7. In a cream-ripener, a suitably-closed vat, provided, in combination with an internally-tempered rotary cream propelling and smoothing device, adapted to circulate the cream from end to end of the vat, such rotary device being surrounded by wide ample return-flow spaces within the vat, substantially as described.

8. In a cream-ripener, a vat, in combination with a hollow shaft extending through said vat, means for rotating said shaft, means for supplying tempering fluid to said shaft, a hollow sheet-metal spiral extending from said shaft outward, openings, communicating with the ends of said spiral, being provided in said shaft, said spiral being wholly within said vat and there being wide return-flow spaces between the spiral and the walls of the vat, substantially as described.

9. In a cream-ripener, a vat, in combination with a hollow shaft supporting a spiral and means for circulating a tempering fluid therethrough, said spiral adapted to cause the longitudinal and lateral circulation of the contents of the vat, being set nearer the head end of said vat than the rear end, and there being wide, ample return-flow spaces between the spiral and the vat-walls, substantially as described.

10. In a cream-ripener, a vat of suitable width, depth and length, in combination with a rotary, internally-tempered circulating, smoothing and tempering device arranged within said vat, there being wide return-flow spaces between said rotary device and the walls of said vat, and said device being capable of imparting both longitudinal and lateral movement to the cream at the center of the vat, and causing the described vigorous eddying, return-flow of cream about the rotary device, substantially as and for the purpose specified.

In testimony whereof I have hereunto set my hand, this 25th day of August, 1904, at Chicago, Illinois, in the presence of two witnesses.

THEODORE L. VALERIUS.

Witnesses:
C. G. HAWLEY,
JOHN R. LEFEVRE.